United States Patent
Pagan

(10) Patent No.: US 7,310,783 B2
(45) Date of Patent: Dec. 18, 2007

(54) SINGLE SUBMISSION BUTTONS

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 10/842,309

(22) Filed: May 10, 2004

(65) Prior Publication Data

US 2005/0251759 A1   Nov. 10, 2005

(51) Int. Cl.
 *G06F 17/00* (2006.01)
(52) U.S. Cl. ................... 715/840; 715/811; 715/825
(58) Field of Classification Search ............. 715/840, 715/501.1, 513, 837, 780, 802, 811, 821, 715/813, 825
See application file for complete search history.

(56) References Cited

U.S. PATENT DOCUMENTS

| | | | | |
|---|---|---|---|---|
| 5,862,395 | A * | 1/1999 | Bier ............................... | 712/1 |
| 6,038,596 | A | 3/2000 | Baldwin et al. ............ | 709/219 |
| 6,237,035 | B1 | 5/2001 | Himmel et al. ............. | 709/224 |
| 6,337,702 | B1 * | 1/2002 | Bates et al. .................. | 715/857 |
| 6,567,819 | B1 * | 5/2003 | Cheng et al. ........... | 707/103 R |
| 6,898,619 | B1 * | 5/2005 | Tran ............................. | 709/203 |
| 6,973,625 | B1 * | 12/2005 | Lupo et al. .................. | 715/762 |
| 7,062,773 | B1 * | 6/2006 | Siksa et al. .................. | 719/329 |
| 7,117,255 | B1 * | 10/2006 | Yamamoto et al. ......... | 709/219 |
| 7,143,416 | B1 * | 11/2006 | Nachef et al. .............. | 719/315 |
| 2003/0120678 | A1 | 6/2003 | Hill et al. ................... | 707/102 |
| 2003/0120698 | A1 * | 6/2003 | Wyke et al. ................ | 709/100 |
| 2004/0078261 | A1 * | 4/2004 | Eustis .......................... | 705/12 |
| 2005/0027640 | A1 * | 2/2005 | Goldenberg et al. .......... | 705/37 |
| 2005/0038708 | A1 * | 2/2005 | Wu .............................. | 705/26 |
| 2006/0139312 | A1 * | 6/2006 | Sinclair et al. ............. | 345/156 |

FOREIGN PATENT DOCUMENTS

| | | |
|---|---|---|
| JP | 2001-166878 | 6/2001 |
| JP | 2001-243127 A | 9/2001 |
| JP | 2001-256402 | 9/2001 |
| JP | 2002-175396 | 6/2002 |

OTHER PUBLICATIONS

RD 415112—Appears to disclose when a filter for a mouse is turned on multiple clicks within a set period of time would result in only a single click being sent in an application, 1 pg., 1999.
"Improved Useability on a Standard Pointing Device Through Filter and Bouncy Key Enablement," Research Disclosure, Nov. 1998, No. 415, p. 1552.

* cited by examiner

*Primary Examiner*—Tadesse Hailu
(74) *Attorney, Agent, or Firm*—Sawyer Law Group LLP

(57) ABSTRACT

A method and mechanism for enforcing a one-submission-only policy for a graphical button is provided. The method provides a button object defined to be enabled for only one submission action upon the button object. When a first submission action upon the button object is detected, the action associated with the button object is executed. When another submission action upon the button object is detected, the other submission action is discarded without executing the associated action. Subsequent submission actions are similarly ignored until the button object is re-instantiated to restore its functionality. In this manner, the one-submission-only behavior is embedded into the button object itself, without reliance on external mechanisms.

6 Claims, 2 Drawing Sheets

SINGLE SUBMISSION BUTTONS

FIELD OF THE INVENTION

The present invention relates to graphical buttons on a screen, and more particularly, to the enforcement of single submission policy to graphical buttons.

BACKGROUND OF THE INVENTION

Many web sites present forms that allow a user to click a button to submit information. Often times, a warning accompanies the button to indicate to the user that he or she should not press the button more than once to allow the data transaction to go through successfully. If the user clicks the button twice anyway, then he or she could potentially perform unwanted tasks (e.g., pay a bill twice, order merchandise twice, etc.).

One conventional approach is to lock out a button when a JavaScript detects a button press or something similarly. However, this solution requires a control mechanism external to the button. If JavaScript is turned off on a browser, or an unsupported browser is used, then the problem persists.

Accordingly, there exists a need for an improved method and mechanism for enforcing a one-submission-only policy for a graphical button. The improved method and mechanism should embed the one-submission behavior in the button itself and require the user to re-instantiate the button to restore its functionality. The present invention addresses such a need.

SUMMARY OF THE INVENTION

A method and mechanism for enforcing a one-submission-only policy for a graphical button has been disclosed. The method provides a button object defined to be enabled for only one submission action upon the button object. When a first submission action upon the button object is detected, the action associated with the button object is executed. When another submission action upon the button object is detected, the other submission action is discarded without executing the associated action. Subsequent submission actions are similarly ignored until the button object is re-instantiated to restore its functionality. In this manner, the one-submission-only behavior is embedded into the button object itself, without reliance on external mechanisms. The enforcement of the one-submission-only policy is thus provided in a consistent and reliable manner.

DETAILED DESCRIPTION

The present invention provides an improved method and mechanism for enforcing a one-submission-only policy for a graphical button. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 and 2 in conjunction with the discussion below.

Figure 1:
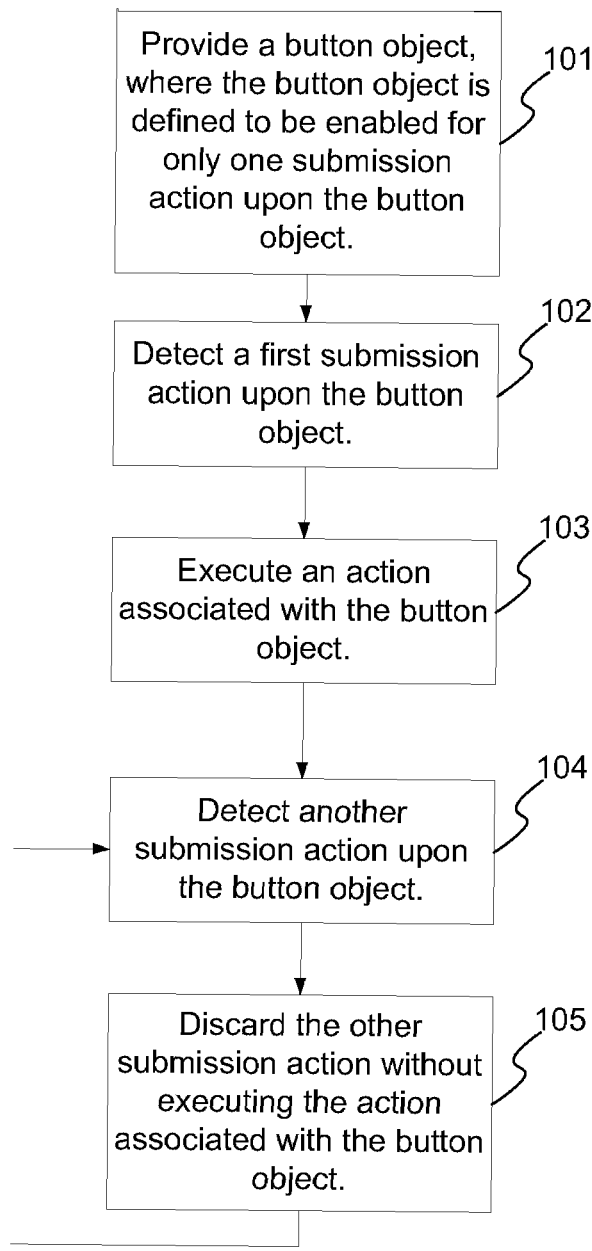
FIG. 1 is a flowchart illustrating a preferred embodiment of a method for enforcing a one-submission-only policy for a graphical button in accordance with the present invention.

FIG. 1 is a flowchart illustrating a preferred embodiment of a method for enforcing a one-submission-only policy for a graphical button in accordance with the present invention. First, a button object is provided, for example on a computer screen, via step 101, where the button object is defined to only be enabled for one submission action upon the button object. By providing a button object that is enabled for one and only one submission action, this button object can be deployed as a stringent control mechanism. Unlike conventional approaches, this solution embeds the one-submission behavior in the button object itself, by defining the object with this characteristic. The enforcement of the one-submission-only policy thus does not rely upon external mechanisms that can be circumvented by a user.

After the button object is provided, a first submission action upon the button object is detected, via step 102. The submission action can be a mouse click or something similar. With the first submission action, the action associated with the button object is executed, via step 103. But, when another submission action upon the button object is detected, via step 104, the other submission action is discarded without executing the action associated with the button object, via step 105.

The submission action can be of any type, including but not limited to a mouse click and a keyboard entry that would normally result in executing the action associated with the button. As such, the first submission action of any kind that causes the associated action to execute would cause the button object to discard any further submission actions that would seek to execute same action again.

In the preferred embodiment, the method above is implemented using computer instructions stored on a computer readable medium, such as a disk or memory. As part of the computer instructions, a button class can be defined to be enabled for only one submission action upon its members. By instantiating the button object as a member of this button class, the button object has the characteristics as defined by the button class.

Figure 2:
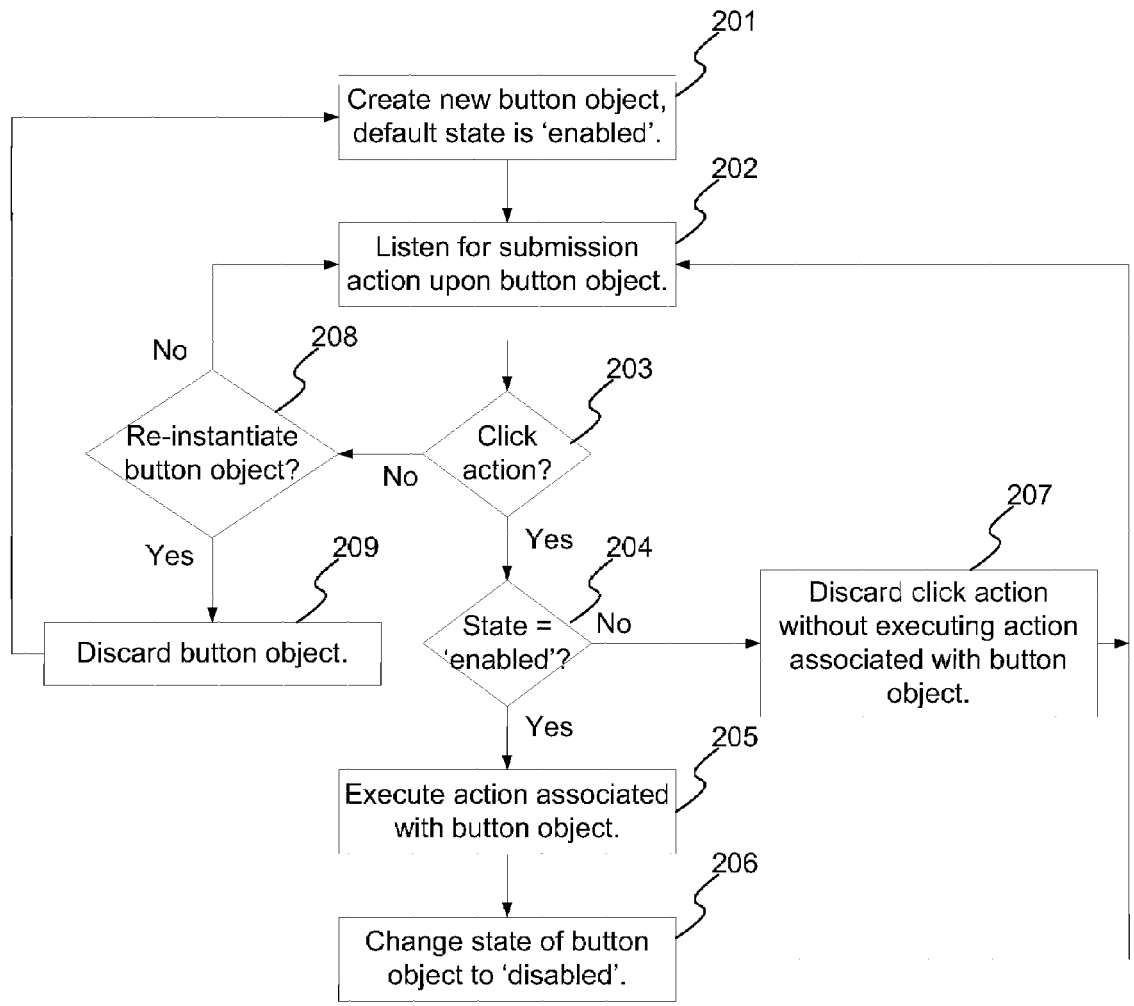
FIG. 2 illustrates in more detail the preferred embodiment of the method for enforcing a one-submission-only policy for a graphical button in accordance with the present invention.

FIG. 2 illustrates in more detail the preferred embodiment of the method for enforcing a one-submission-only policy for a graphical button in accordance with the present invention. First, the button object is instantiated, with its default state as 'enabled', via step 201. As stated above, the button object is defined to be enabled for only one submission action upon the button object. Then, a listener algorithm listens for a submission action upon the button object, via step 202. Also, if the button object is to be re-instantiated, via step 208, then the button object is discarded, via step 209, and a new button object is created, via step 201, with its default state set to 'enabled'. When a submission action is heard or detected, via step 203, the current state of the button object is examined, via step 204. If the current state is 'enabled', then the action associated with the button object is executed, via step 205. The state of the button object is then changed to 'disabled', via step 206. If the current state of the button object is not 'enabled', i.e., the state is 'disabled', then the submission action is discarded without executing the action associated with the button object, via step 207. Thus, until the button object is re-instantiated, the one-submission-only policy is enforced for the button object.

For example, assume that the environment is a web browser. Assume also that a button object associated with submitting an on-line purchase is instantiated onto a web page, via step 201. The default state of this button object is 'enabled'. In this context, it is undesirable for a user to click on the button object more than once, as this may result in multiple submissions of the same purchase. Thus, a button object defined to be enabled for only one submission action upon the button object is used. Once instantiated, the listener listens for a mouse click or other submission action (e.g. keyboard entry, etc.) upon the button object, via step 202. When the user mouse clicks on the button object the first time, the listener detects the click action, via step 203. Since the current state of the button object is 'enabled', via step 204, the purchase is submitted, via step 205. Then, the state of the button object is changed to 'disabled', via step 206.

Then, assume that the user mouse clicks on the button object a second time. The listener detects the second mouse click, via step 203, and determines that the current state of the button object is 'disabled', via step 204. Thus, the second mouse click is discarded without submitting the purchase, via step 207. In this manner, until the button object is re-instantiated, subsequent mouse clicks on the button object by the user does not result in a repeat of the purchase submission.

In this example, the clickability of the button object can be restored by refreshing or reloading the web page, thus re-instantiating the button object. Upon reloading of the web page, via step 208, the disabled button object is discarded, via step 209. A new button object is then created and displayed on the web page, via step 201. The re-instantiation can be requested in other ways without departing from the spirit and scope of the present invention. For example, if the button object is provided on a form by an application, the application can close the form and re-present it. Other ways are possible.

Although the preferred embodiment is described above as enforcing a one-click-only policy, one of ordinary skill in the art will understand that the button object can be defined with any number of clicks, as well as with any other additional characteristics, such as monitoring keyboard submissions or a combination of submission methods, without departing from the spirit and scope of the present invention.

A method and mechanism for enforcing a one-submission-only policy for a graphical button has been disclosed. The method provides a button object defined to be enabled for only one submission action upon the button object. When a first submission action upon the button object is detected, the action associated with the button object is executed. When another submission action upon the button object is detected, the other submission action is discarded without executing the associated action. Subsequent submission actions are similarly ignored until the button object is re-instantiated to restore its functionality. In this manner, the one-submission-only behavior is embedded into the button object itself, without reliance on external mechanisms. The enforcement of the one-submission-only policy is thus provided in a consistent and reliable manner.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer readable medium encoded with a computer program for enforcing a one-click-only policy for a graphical button object that is displayable on a computer screen, the one-click-only policy preventing a user from inadvertently activating a pre-determined action associated with the graphical button object more than one time, the computer program comprising computer executable code for:

displaying the graphical button object on a computer screen, the graphical button object having been previously instantiated from a button class, the button class embedding the one-click-only policy within the graphical button object so that a JavaScript external to the graphical button object is not required to enforce the one-click-only policy for the graphical object;

responsive to receiving user input clicking on the graphical button object displayed on the computer screen for a first time, activating the pre-determined action associated with the graphical button object; and responsive to receiving user input clicking on the graphical button object displayed on the computer screen for a second time subsequent to the first time, not activating the pre-defined action associated with the graphical button object in accordance the one-click only policy embedded in the graphical button object.

2. The computer readable medium of claim 1, wherein:

the graphical button object is displayed on the computer screen within a web page; and the computer program further comprises computer executable code for discarding the graphical button object and re-instantiating a second graphical button object responsive to the web page being reloaded, wherein a pre-determined action associated with the second graphical button object is activatable responsive to user input clicking on the second graphical button object for a first time.

3. The computer readable medium of claim 2, wherein the pre-determined action associated with the graphical button object or the second graphical button object includes one of payment of a bill through the web page, ordering of merchandise through the web page, or submission of information through the web page.

4. A computer-implemented method for enforcing a one-click-only policy for a graphical button object that is displayable on a computer screen, the one-click-only policy preventing a user from inadvertently activating a pre-determined action associated with the graphical button object more than one time, the method comprising:

displaying the graphical button object on a computer screen, the graphical button object having been previously instantiated from a button class, the button class embedding the one-click-only policy within the graphical button object so that a JavaScript external to the graphical button object is not required to enforce the one-click-only policy for the graphical object;

responsive to receiving user input clicking on the graphical button object displayed on the computer screen for a first time, activating the pre-determined action associated with the graphical button object; and responsive to receiving user input clicking on the graphical button object displayed on the computer screen for a second time subsequent to the first time, not activating the pre-determined action associated with the graphical button object in accordance with the one-click-only policy embedded in the graphical button object.

5. The method of claim 4, wherein:

the graphical button object is displayed on the computer screen within a web page; and the method further comprises discarding the graphical button object and re-instantiating a second graphical button object responsive to the web page being reloaded, wherein a pre-determined action associated with the second graphical button object is activatable responsive to user input clicking on the second graphical button object for a first time.

6. The method of claim 5, wherein the pre-determined action associated with the graphical button object or the second graphical button object includes one of payment of a bill through the web page, ordering of merchandise through the web page, or submission of information through the web page.

* * * * *